(12) United States Patent
Verkindt (10) Patent No.: US 7,909,079 B2
(45) Date of Patent: Mar. 22, 2011

(54) RADIO FREQUENCY WELDING SYSTEM FOR FLEXIBLE WORK PIECES AND APPARATUSES FOR SAME

(75) Inventor: Glenn Verkindt, Terra Cotta (CA)

(73) Assignee: GMA Cover Corp., Guelph (CA)

( * ) Notice: Subject to any disclaimer, the term of this patent is extended or adjusted under 35 U.S.C. 154(b) by 1115 days.

(21) Appl. No.: 11/328,068

(22) Filed: Jan. 10, 2006

(65) Prior Publication Data

US 2007/0158342 A1    Jul. 12, 2007

(51) Int. Cl.
H05B 6/46    (2006.01)

(52) U.S. Cl. ............ 156/379.8; 219/764; 219/780; 219/765

(58) Field of Classification Search ........... 219/765, 219/767, 777, 778, 780, 242, 56, 58, 86.1, 219/86.24, 86.25, 158, 161, 87, 116; 140/112
See application file for complete search history.

(56) References Cited

U.S. PATENT DOCUMENTS

| 2,753,671 | A | * | 7/1956 | De Puy et al. ............... 53/511 |
| 4,091,254 | A | * | 5/1978 | Struve ........................ 219/79 |
| 4,268,338 | A | * | 5/1981 | Peterson .................... 156/251 |
| 4,921,568 | A | * | 5/1990 | Whiffen .................... 156/379.8 |
| 5,722,646 | A |   | 3/1998 | Soderberg et al. |
| 6,009,925 | A | * | 1/2000 | Hall et al. .................. 156/358 |
| 6,209,188 | B1 |  | 4/2001 | Soderberg et al. |
| 6,559,432 | B1 |  | 5/2003 | Moore, Jr. |

FOREIGN PATENT DOCUMENTS

GB    2217247 A   * 10/1989
JP    07080657 A  *  3/1995

* cited by examiner

*Primary Examiner* — Quang T Van
*Assistant Examiner* — Jianying Atkisson
(74) *Attorney, Agent, or Firm* — Macleod Dixon LLP (57) ABSTRACT

A radio frequency welding system for flexible work pieces having a top-side and an underside. The welding system includes a fixed weld platform, a mobile radio frequency welder adapted to move over the fixed weld platform, movable welding electrodes configured over the fixed weld platform and adapted to engage the underside of the flexible work pieces and movable grounding apparatus adapted to engage the fixed weld platform and the mobile radio frequency welder so as to provide a return radio frequency electrical circuit.

16 Claims, 9 Drawing Sheets

FIG. 12

RADIO FREQUENCY WELDING SYSTEM FOR FLEXIBLE WORK PIECES AND APPARATUSES FOR SAME

FIELD OF THE INVENTION

This invention relates in general to a process for radio frequency welding of flexible work pieces and more particularly to a radio frequency welding system made up of different apparatuses for welding flexible fabric on a large scale.

BACKGROUND OF THE INVENTION

Depending on the work pieces that need to be joined, it is often desirable to join the flexible materials without actually stitching the materials together as this would create holes in the materials through which liquid could penetrate. For example, flexible thermoplastic materials, such as vinyl sheeting or coated fabrics would benefit from being joined together without stitching.

One common method for forming such a joint is by welding two or more flexible materials together using radio-frequency (R-F) welding which fuses the materials together to form an integral weld, thereby eliminating the need to stitch the materials together. This method is also known as high-frequency welding.

Prior art methods for forming R-F welds between flexible materials have typically included the use of bar presses, where a single, elongated electrode bar is attached to a moveable upper or lower platen of a press. The desired work pieces that need to be joined are positioned on a lower platen of the press, and once the work pieces are in position, the upper platen and attached electrode bar are lowered to compress the work pieces between the electrode bar and the bottom platen. During the compression of the work pieces, the radio-frequency energy is applied to the electrode bar to weld the work pieces together.

This typical welding system has a number of drawbacks. Depending on the positioning of the desired welds, the work piece may have to be repositioned on the lower platen, and the upper platen engaged again to continue the welding process. Therefore depending on the welds required, multiple, repeated operations are required resulting in manufacturing inefficiencies, including long cycle times in the production a welded article, and inoperative and under-utilized welders during the down time between welds. These inefficiencies and equipment underutilizations drive up manufacturing costs, making the manufacturer less competitive in the marketplace. Also most of these welding systems included a fixed R-F welding machine, and sliding work platforms which does not allow for large work pieces to be welded efficiently.

Furthermore as noted above, typical welding machines have a single electrode that is fixed to the upper platen of the welder that therefore engages the topside of the flexible work piece. This single electrode is therefore used repeatedly to either weld the same parts over and over again, or to weld repeated hits on the same part (for example, a long seam would require many repeated hits by a shorter electrode). As a result of the dedicated nature of this type of welder, the welder is not very flexible to retool when different products need to go into production. Other typical welding systems may not have the welding electrodes connected to the upper platen of the welder, but still have the welding electrodes located above the fabric work piece. Furthermore these systems typically must have the weld electrode engage the positioning features which are either fastened to an electrode base, or directly to the work platform making weld electrode changeover from one product to another very slow and inefficient.

Moreover depending on the industry, a welding system may be required to provide a large variety of R-F welded parts, but in relatively small quantities. To meet this challenge of being able to produce a large variety of welded parts in small quantities, the welding system has to be able to accommodate quick and flexible retooling specifically with respect to the electrode configuration.

Finally it is also important to control the appearance of the fabric at the weld location specifically the gloss level, and to provide an inherent method of preventing the flexible work piece from sticking to the upper platen of the welder. Traditionally mechanical clamps are used to hold the flexible work piece in place. The positioning of these clamps are however prone to human error and are labour intensive. With a typical industry that utilizes dedicated R-F welders for specific weld tasks, a system of automated clamps or other mechanical means of preventing parts from sticking to the electrode on the upper platen could be developed to overcome this issue. An automated clamping system however would not be feasible where a large variety of parts in small quantities are needed.

Thus a R-F welding system for welding flexible work pieces which allows for easy reconfiguration of multiple electrodes with maximum flexibility of electrode layouts, maximum process automation and repeatability on large R-F welders with large welding platforms, easy and accurate positioning of the work pieces on the weld platform, easy removal of the work piece once welding has occurred, and improved appearance of the final product is desirable.

SUMMARY OF THE INVENTION

An object of one aspect of the present invention is to provide an improved radio frequency welding system for flexible work pieces.

In accordance with one aspect of the present invention there is provided a radio frequency welding system for flexible work pieces having a top-side and an underside. The welding system includes a fixed weld platform, a mobile radio frequency welder adapted to move over the fixed weld platform, movable welding electrodes configured over the fixed weld platform and adapted to engage the underside of the flexible work pieces. Movable grounding apparatus are adapted to engage the fixed weld platform and the mobile radio frequency welder so as to provide a return radio frequency electrical circuit.

The flexible work piece can be positioned over the fixed weld platform and movable welding electrodes. The mobile radio frequency welder can then move over the topside of the flexible work piece and fixed platform, and therefore engage the movable welding electrodes through the flexible work piece.

Conveniently, the radio frequency welding system further includes a template system adapted to engage the fixed weld platform and having a system to identify, position and retain the flexible work piece. Furthermore the movable grounding apparatus is at least one ground block adapted to engage the fixed weld platform or is at least one biased, retractable ground block.

Preferably, the biased, retractable ground block is biased in resting position by a spring and is moved to an actuating position by a vacuum system. Furthermore the radio frequency welding system may further include a chilling system adapted to control the temperature variation of the mobile radio frequency welder. The radio frequency welding system may further include a buffering system having a near nonstick buffer adapted to engage the flexible work piece and the mobile radio frequency welder and a slightly sticky buffer adapted to engage the flexible work piece and the movable welding electrodes.

Advantages of the present invention are: easy reconfiguration of multiple electrodes with maximum flexibility of electrode layouts, maximum process automation and repeatability on large R-F welders with large welding platforms, easy and accurate positioning of the work pieces on the weld platform, easy removal of the work piece once welding has occurred, improved appearance of the final product, all electrodes are located under the fabric work pieces which allows progressive welding of parts from one electrode to another without the need to move any electrodes, only fabric parts are moved during a normal production cycle, the welding system does not require any of the elements of the welding system to be fastened to the work platform but uses a template system which locates and retains all electrodes without any mechanical fastening, utilizes larger scale work platform, in which the work platform is stationary, the welding machine is mobile, and includes an efficient grounding apparatus do address the R-F energy circuit due to the mobility of the welding machines.

BRIEF DESCRIPTION OF THE DRAWINGS

A detailed description of the preferred embodiments is provided herein below by way of example only and with reference to the following drawings, in which.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring to FIGS. 1 to 5, there is illustrated a radio frequency (R-F) welding system 10 for flexible work pieces 12 having a top-side 14 and an underside 16 in accordance with a preferred embodiment of the present invention. The welding system 10 includes a fixed weld platform 18, a mobile radio frequency (R-F) welder 20 adapted to move over the fixed weld platform 18. Movable welding electrodes 22 are configured over the fixed weld platform 18 and are adapted to engage the underside 16 of the flexible work pieces 12. The welding system 10 also includes movable grounding apparatus 24 adapted to engage the fixed weld platform 18 and the mobile radio frequency welder 20 so as to provide a return radio frequency electrical circuit.

Figure 1:
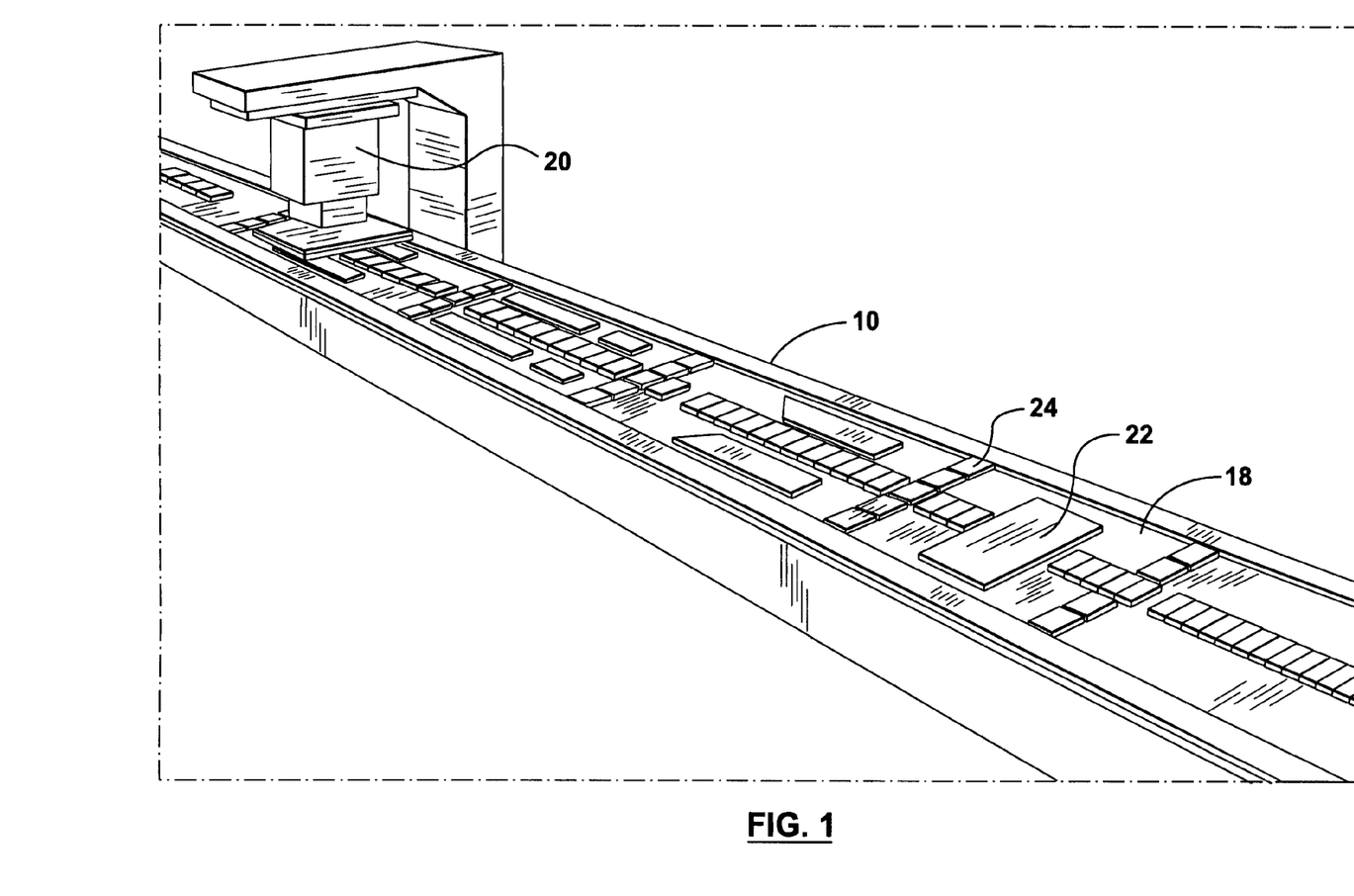
FIG. 1 in a schematic view, illustrates a radio frequency welding system in accordance with the preferred embodiment of the present invention.
Figure 2:
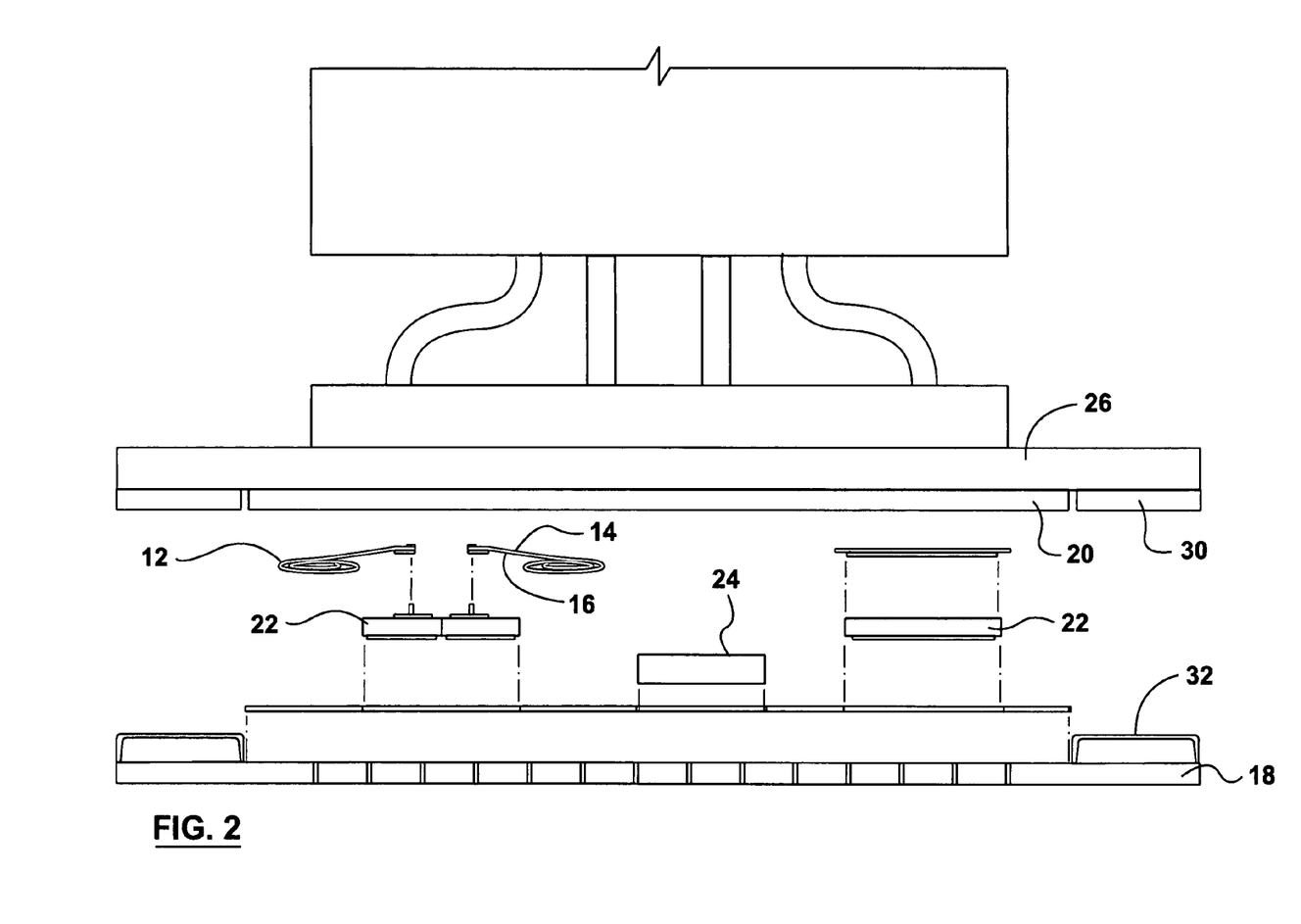
FIG. 2 in an exploded view, illustrates the system of FIG. 1.
Figure 3:
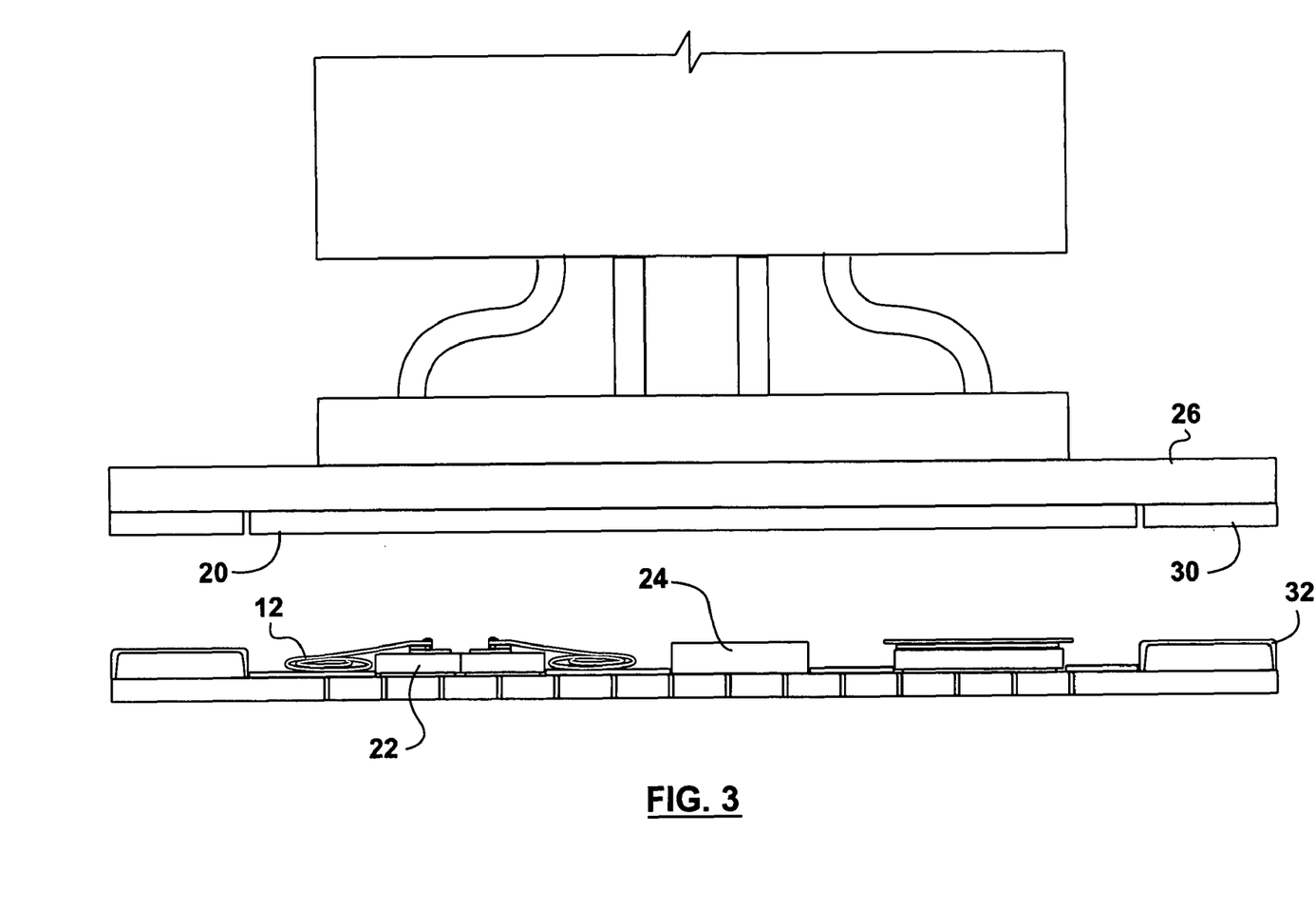
FIG. 3 in a side view, illustrates the system where the upper platen is not engaged FIG. 1.

More specifically the fixed weld platform 18 may be as large as 5.5 feet wide by 100 feet long by way of example only. The mobile R-F welder 20 may be further defined as having an upper platen 26 that is smaller than the fixed weld platform 18 and the layout of the flexible work pieces 12, and that engages the top-side 14 of the flexible work piece 12. Specifically, the mobile R-F welder 20 can move along the fixed weld platform 18 (x-axis), across the fixed weld platform 18 (y-axis), or rotate (z-axis) to reach any of the movable welding electrodes 22 positioned anywhere on the fixed weld platform 20.

The movable welding electrodes 22 are not fixed to the fixed weld platform 18 in any way, but can be moved over the fixed weld platform 18 to form the desired configuration for welding the flexible work piece 12. When fabricating a large variety of R-F welded parts, but in relatively small quantities, these different parts or subcomponents are R-F welded by a large number of different electrodes. For maximum efficiency, the same R-F welder is used to perform many successive welds using a different welding electrode for each instead of multiple R-F welders dedicated to specific electrodes. For this reason, the movable welding electrodes 22 cannot be fixed to the upper platen 26 of the mobile R-F welder 20, but are instead arranged, but not mounted in a specific configuration over the fixed weld platform 18. Therefore the movable welding electrodes 22 sit on the fixed weld platform 18 under the flexible work pieces 12 so as to engage the underside 16 of the flexible work piece 12. In this manner the configuration of the movable welding electrodes 22 can change after every eight (8) hour shift, which is very atypical in the general industry, however very beneficial when producing a large variety of R-F welded parts.

The movable welding electrodes 22 may be moved to different configurations by a shuttle system (not shown). More specifically the movable welding electrodes 22 are mounted to the shuttle system and are moved and positioned on the fixed weld platform 18 while the mobile R-F welder 20 moves along the fixed weld platform 18. Specifically the mobile R-F welder 20 is programmed to move successively from one electrode to the next until all parts are welded. While the welder automatically progresses down the platform, operators load and unload parts from the electrodes. In this way, the mobile R-F welder 20 utilization is very high because there are always parts ready to weld at the next position. The welder does not have to wait for parts to be loaded or moved, or for electrodes to be moved. Once all the welds have been completed the mobile R-F welder 20 returns to the original position to start the process over. The movable welding electrodes 22 are configured so that all subcomponents are welded first, after which the subcomponents are progressively moved to other electrodes until a final assembly is completed. Specifically the R-F welding system 10 can be used to progressively create large R-F welded fabric assemblies from a number of smaller subcomponents.

The large fixed weld platform 18 allows all of the movable welding electrodes 20 to be arranged directly on the fixed weld platform 18 in the most efficient layout possible. The movable R-F welder 20 can be programmed to automatically advance from one electrode layout to the next to progressively construct a fabric assembly in the most efficient manner. By having the R-F welder 20 mobile so that it can move along, across and about the large, fixed weld platform 18, the welding process maximizes its efficiencies compared to using a fixed welding machine with a much smaller weld platform.

With a large fixed weld platform 18 and a mobile R-F welder 20, one major technical challenge is to be able to provide sufficient ground return for the R-F electrical circuit. Typically, a fixed welder has a fixed ground return directly connected in the R-F electrical circuit. Specifically the R-F energy is created in the generator, it passes through the upper platen, through the electrode and fabric, through the welder platform and directly back to the generator to complete the circuit. With a mobile R-F welder 20, the use of the movable grounding apparatus 24 that is adapted to engage the fixed weld platform 18 and the mobile radio frequency welder 20 provides the return for the radio frequency electrical circuit. Specifically the movable grounding apparatus 24 may be further defined as ground bars 30 and ground blocks 32. The ground bars 30 are mounted to the upper platen 26 of the mobile R-F welder 20 and therefore move along with the mobile R-F welder as it follows its programmed pathway. As noted above the combination of a large fixed weld platform 18 (5.5'×100') and a mobile R-F welder 20 means that there cannot be a direct return between the fixed weld platform 18 back to the generator because there is just too much movement between the fixed weld platform 18 and the mobile R-F welder 20. The ground bars 30 help provide a return path to the generator.

Finally the return circuit link between the ground bars 30 and the fixed weld platform 18 is achieved by the series of ground blocks 32 which can be placed anywhere on the fixed weld platform 18. The ground blocks 32 are not permanently mounted to the fixed weld platform 18 and can moved to desired positions. The ground blocks 32 function as a spacer and can contact the ground bars 30 when the upper platen 26 is lowered during the welding operation, therefore positioning the ground bars 30 on a level higher than the movable welding electrodes 22.

The ground blocks 32 allow the mobile R-F welder 20 to be used with the movable welding electrodes 22 that are positioned beyond the edges of the upper platen 26. Furthermore the upper platen 26 is smaller than the set up of ground blocks 32 and the flexible work pieces 12 to be welded (FIG. 1). Without the ground blocks 32 the movable welding electrodes 22 would interfere with the ability of the ground bars to contact the fixed weld platform 18 during the welding process and close the R-F electrical circuit and return energy to the generator.

Figure 5:
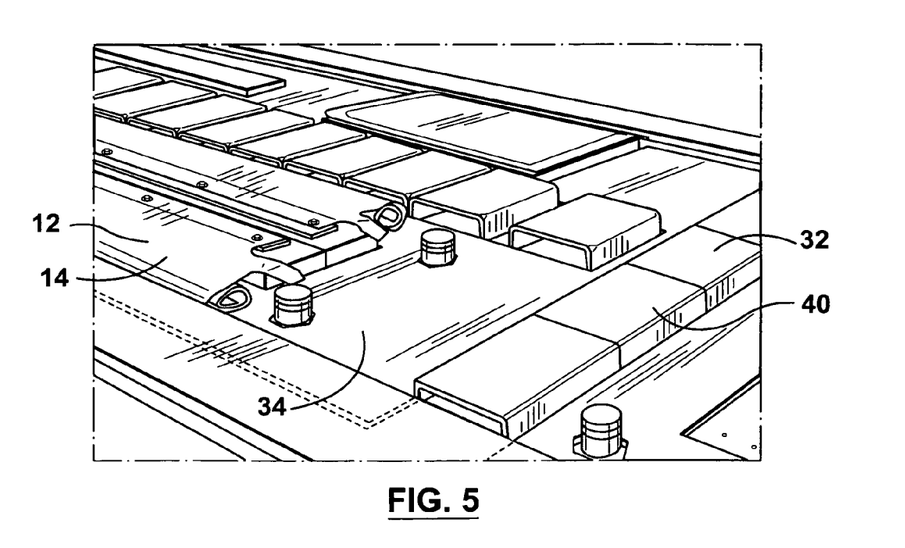
FIG. 5 in a perspective view, illustrates the work piece positioned on the system of FIG. 1.
Figure 6:
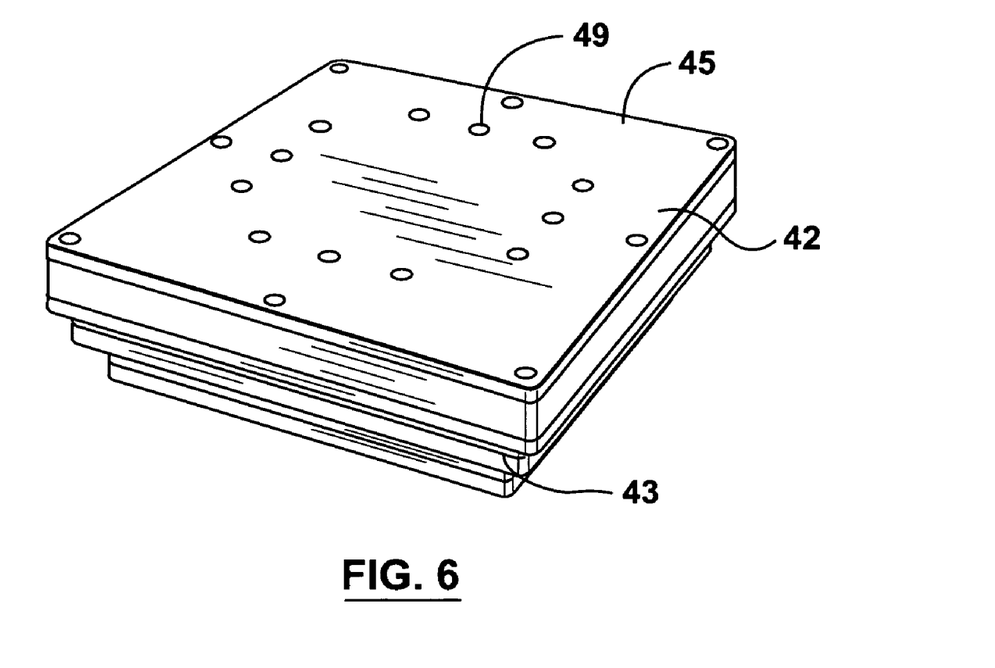
FIG. 6 in a top perspective view illustrates the biased retractable ground blocks of the system of FIG. 1.
Figure 7:
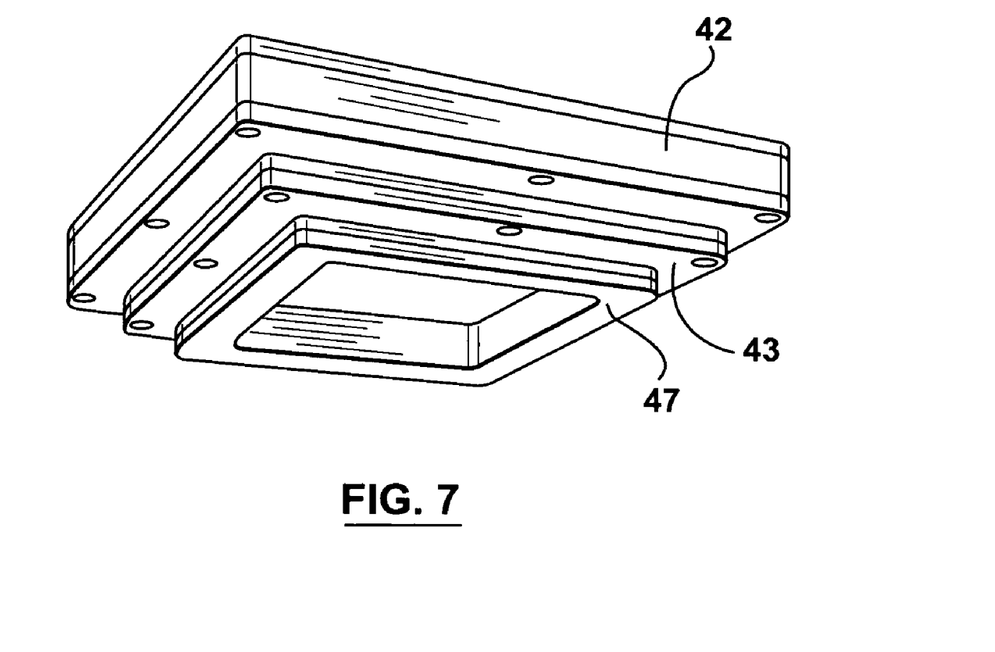
FIG. 7 in a bottom perspective view illustrates the biased retractable ground blocks of the system of FIG. 1.

Referring to FIGS. 5 to 7 the ground blocks 32 may either be a fixed ground block 41 that provides an R-F energy return path from the fixed weld platform to the ground bars 30 on the mobile R-F welder 20 or a biased, retractable ground block 42 having a top side 45 and a bottom side 47. The biased, retractable ground block may be further defined as having a collapsing column 43. The biased, retractable ground block 42 can move between a first resting position, where the retractable ground block 42 has a regular height, to a second collapsed position which has a collapsed height from its regular height. More specifically the biased, retractable ground block 42 has a first stage collapsed height and a second stage collapsed height. The biased retractable ground block 42 is designed with the two stage collapsing column 43 to minimize the collapsed height, while maintaining a robust ground return path for R-F energy at its regular height. The biased, retractable ground block 42 is biased in the resting position by a spring (not shown).

The ability for the retractable ground block 42 to move from the resting position to the collapsed position can be used, for example, when the retractable ground block 42 interferes with the upper platen 26 of the movable R-F welder 20. The retractable ground block 42 can be moved back to the resting position when the retractable ground block 42 is required for providing ground return when the movable R-F welder 20 is in one position.

The collapsing feature of the retractable ground block 42 may be actuated in a number of ways such as air pressure, solenoid, or hydraulics. The preferred way to the retractable ground block is by a vacuum system 44. The vacuum system 44 is routed under the fixed weld platform 18 directly under the weld area or upper platen 26, and programmed to follow the movement of the mobile radio frequency welder 20 so that even upon rotation, the vacuum area is always located directly under the upper platen 26. Referring to FIGS. 6, 7, 8, and 9*a* the fixed weld platform 18 and the biased, retractable ground block 42 further includes a series of holes 46 and 49 respectively 44 so that when the vacuum system 44 is actuated a vacuum is created through the series of holes 46. Upon actuation of the vacuum system 44, the vacuum force collapses the collapsing column 43 by overcoming the opposing force of the spring. The deactivation of the vacuum system allows the spring force to return the biased retractable ground block 42 to its regular height in the first resting position. Furthermore the vacuum system 44 is programmable so that the vacuum system 44 can be turned on or off automatically as the mobile R-F welder 20 progresses through each weld position. The activation of the vacuum system 44 also allows for the correct positioning of the work piece 12 on the fixed weld platform 18 so as to prevent the flexible work pieces 12 from sticking to the upper platen 26 after welding.

Figure 4:
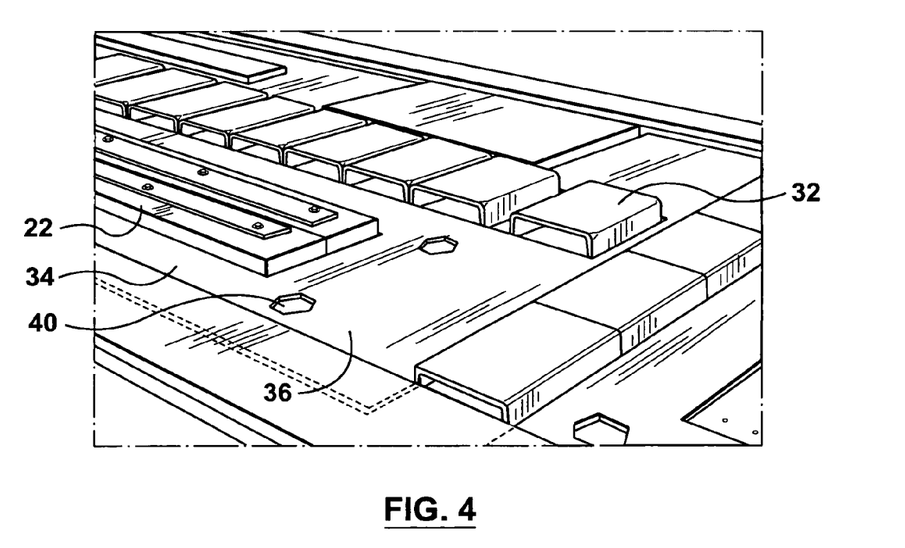
FIG. 4 in a perspective view, illustrates template system.
Figure 8:
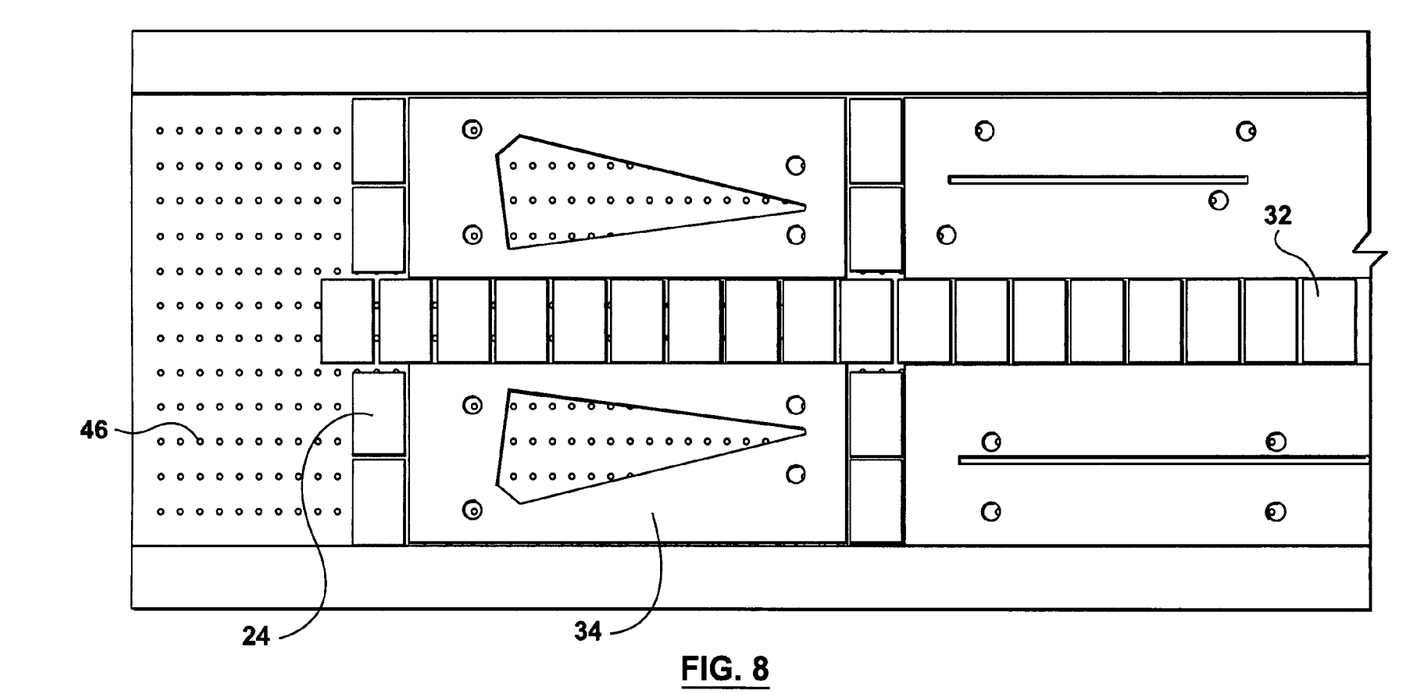
FIG. 8 in a top plan view, illustrates template system of system in FIG. 1.
Figure 9A:
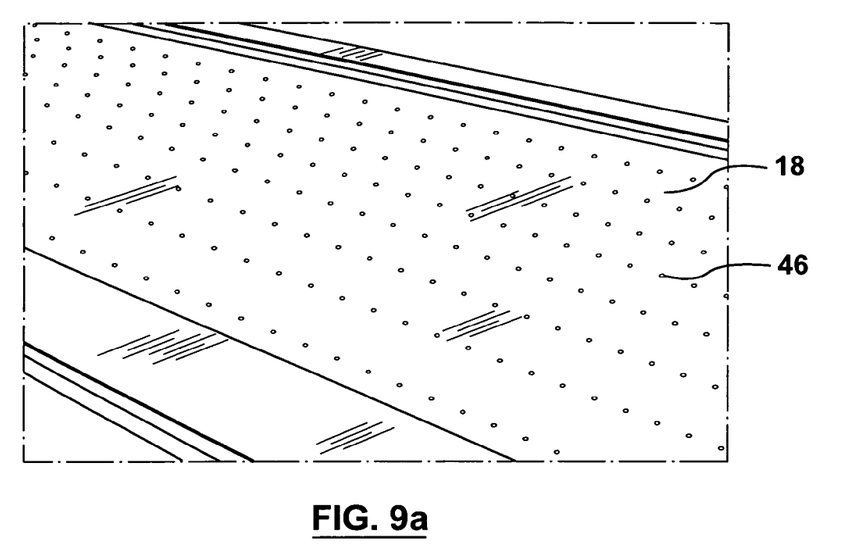
FIG. 9*a* illustrates in a perspective view the series of holes in the fixed weld platform for the vacuum system of the system of FIG. 1.
Figure 9B:
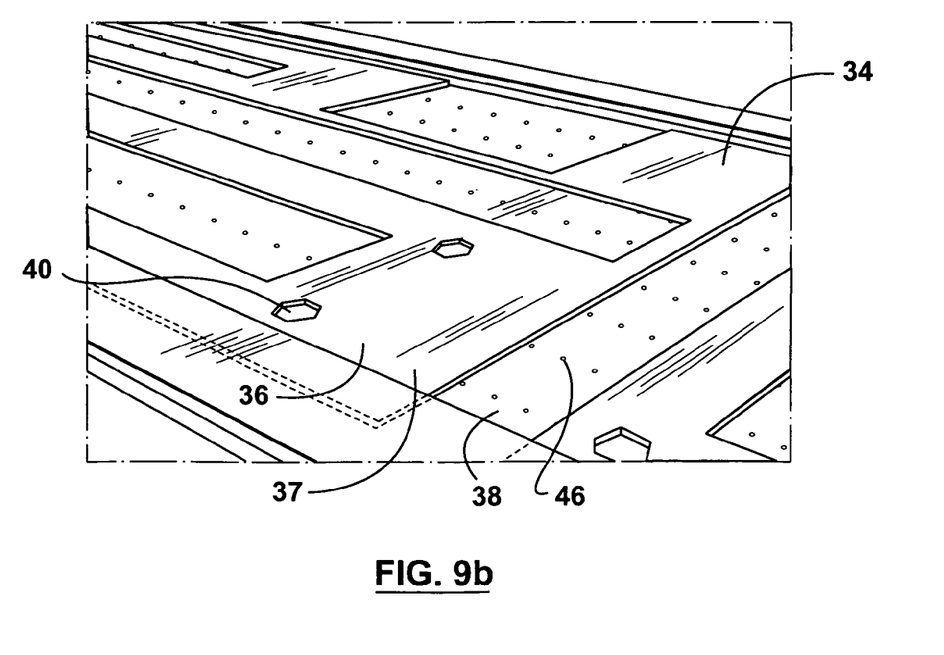
FIG. 9*b* illustrates in a perspective view the template and positioning system of the system of FIG. 1.

Referring to FIGS. 4, 8, and 9*b* the R-F welding system 10 may further include a template system 34 adapted to engage the fixed weld platform 18 and having a system to identify, position and retain the flexible work piece 12. Specifically the template system 34 helps identify, position, and retain the movable welding electrodes 22, the ground blocks 32 and other components such as the weld stops. The template system 34 allows for quick changes of the movable welding electrodes 22 and more specifically the layouts of the movable welding electrodes 22 for each different subcomponent that is to be welded. This requirement for quick changes is generally unique in the R-F welding industry. The template system 34 includes a number of rubber sheets 36 which can each be independently positioned on the fixed weld platform 18. The rubber sheets 36 have cut-outs 40 that correspond to the positioning of the movable welding electrodes 22, ground blocks 32, as well as other components, such as weld stops by way of example only. The cut-outs 40 in the template system 34 allow for easy and quick set-up changes by the operators from one product to another. This quick change set-up is further aided by the fact that all the movable welding electrodes 22 and the ground blocks 32 merely sit on the fixed weld platform 18 within the cut-outs 40 and are not mechanically mounted to the fixed weld platform 18. The thickness of the rubber sheets 36 is sufficient to prevent the movable welding electrodes 22, ground blocks 32, as well as other components from sliding out of position.

The template system 34 further includes a positioning system 38 that allows each section of each rubber sheet 36 to be accurately placed on the fixed weld platform 18 independent from all other sections of the rubber sheet 36. More specifically the positioning system 38 includes positioning identifying symbols 37, such as numbers and letters, regularly indexed along and across the weld platform 18 similar to a grid. The rubber sheets 36 include the same positioning identifying symbols 37 as those found on the weld platform 18. In operation a rubber sheet 36 with its positioning identifying symbols 37 is positioned on the weld platform 18 at a position that matches the positioning identifying symbols 37 found on the weld platform 18, thereby easily and accurately positioning the rubber sheet 36 in its proper location.

The template system 34 therefore allows for the repeated locating of all of the movable welding electrodes 22, ground blocks 32, and other items on the fixed weld platform 18 so that the mobile R-F welder 20 will consistently and properly locate itself over the movable welding electrodes 22 when running in automatic mode.

Figure 10:
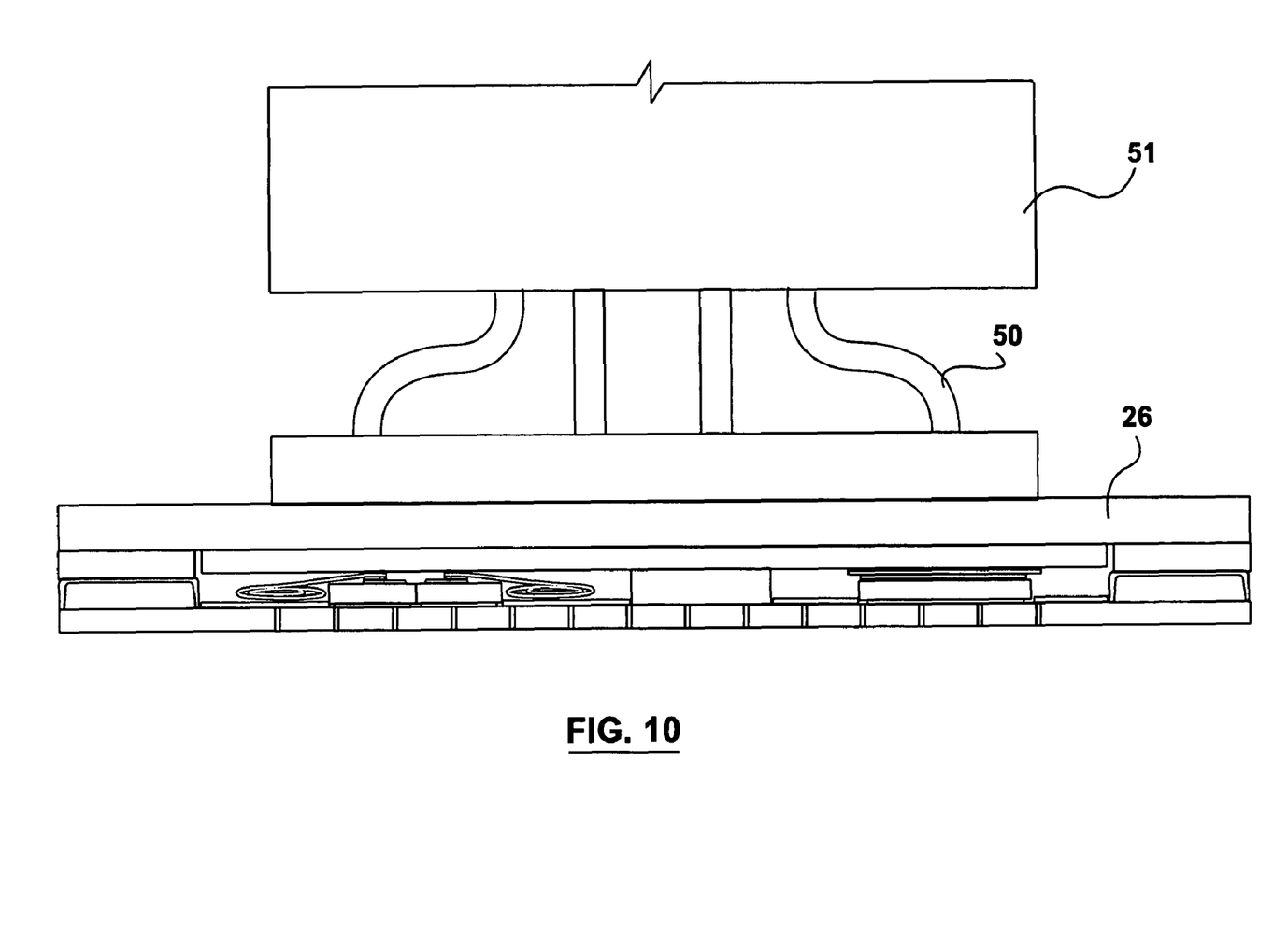
FIG. 10 illustrates in side view the chilling system of the system of FIG. 1.

Referring to FIG. 10 the R-F welding system 10 further includes a chilling system 50 adapted to control the temperature variation of the mobile radio frequency welder 20. Specifically the chilling system 50 is integral in keeping the temperature swings of the upper platen 26 to a minimum. The chilling system 50 includes typical refrigeration units 51 mounted to the mobile R-F welder 20. The upper platen 26 of the mobile R-F welder 20 further includes passages (not shown) that run through the inside of the upper platen 26. The passages allow for coolant to be pumped through the upper platen 26 cooling the upper platen 26 and returning the warmed coolant back to the refrigeration units 51.

In operation when the R-F welding system 10 is first actuated the upper platen 26 is cool or at ambient temperature. However during use, the upper platen 26 can gradually become quite hot. After a period of rest the upper platen 26 will tend to cool down again. The large temperature variations can have a large and varied effect on part appearance, weld consistency, and work pieces 12 sticking to the upper platen 26 after welding. The chilling system 50 is integrated with the mobile R-F welder 20 so as to keep the temperature swings of the upper platen 26 to a minimum, thereby providing more control and consistency over part appearance, weld consistency, and non-stick performance which is crucial to an automated process.

The chilling system 50 is specifically important where the work piece 12 is made from vinyl fabric, as vinyl fabric will not only melt and weld solely from R-F energy but also from directly applied heat. Direct heat however does not effectively weld layers of vinyl that may make up the work piece 12 as the heat has to be conducted from the outer surface to the work piece 12 interface between work piece 12 layers. Typically the outer surface of the work piece 12 becomes melted before the heat reaches the interface between the work piece 12 layers. With R-F energy, the heat is evenly distributed through the thickness of the work piece 12. Furthermore with a relatively cool upper platen 26 and welding electrodes 22, the outer surfaces of the work piece 12 are kept comparatively cool, while the interface between the work piece 12 layers reaches the melting temperature. As an added benefit, the cooler outer surface of the work piece 12 minimizes damage, and better maintains its original appearance.

The chilling system allows for a consistent temperature for the upper platen 26 which is critical to having a consistent weld performance. For example if the upper platen 26 is too cold, the weld will be poor as more heat is required to be conducted to the upper platen 26 than to the work piece 12. Conversely, if the upper platen 26 is too hot the work piece 12 may become over welded if, as less heat will tend to be conducted out of the work piece 12. As an added problem, the excess heat in the work piece 12 will tend to damage the outer appearance. Moreover, when the surface of the work piece 12 starts to melt, the surface of the work piece 12 becomes sticky and tends to stick to the upper platen 26 after the weld, thereby disrupting the automated welding process. Therefore when the upper platen 26 is temperature controlled within a fixed band, the work pieces 12 do not stick to the upper platen 26, consistent welds are more likely, and part appearance can be maintained.

Figure 11:
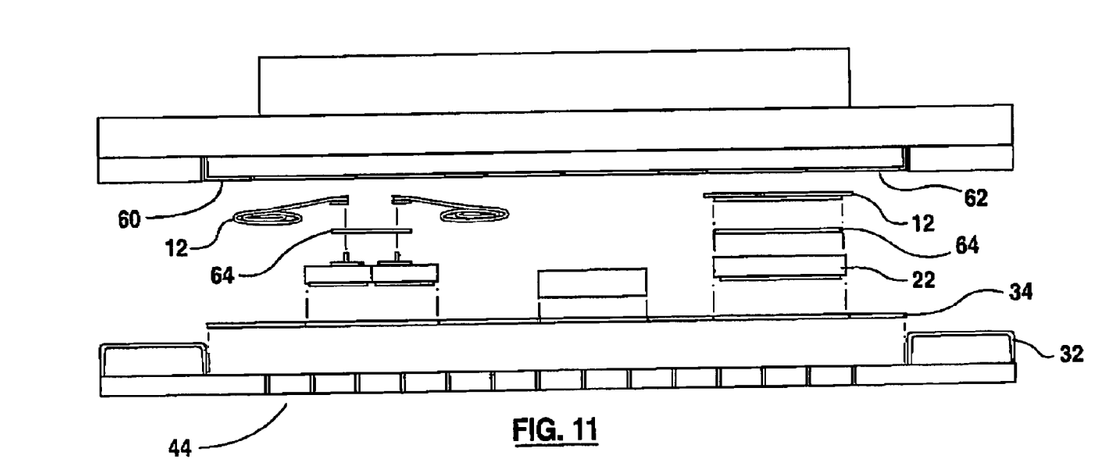
FIG. 11 in an exploded side view, illustrates the buffering system of the system of FIG. 1.
Figure 12:
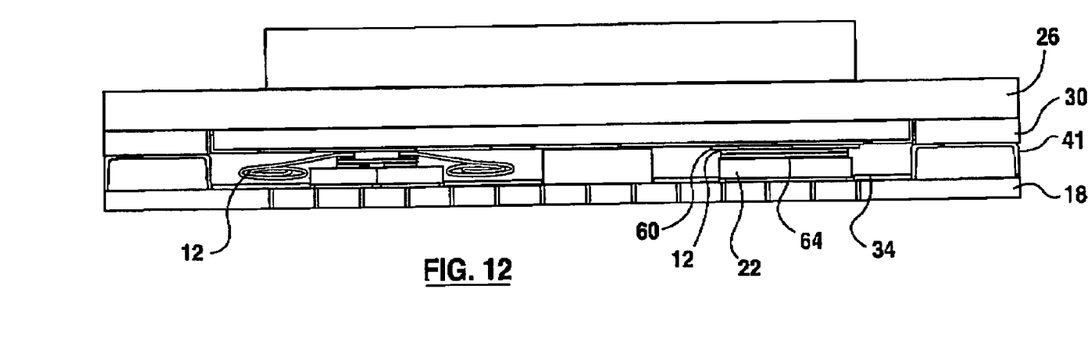
FIG. 12 in a side view, illustrates the buffering system of the system of FIG. 1.

Referring to FIGS. 11 and 12, with such an automated R-F welding system 10, it is imperative that the welded parts do not adhere to the upper platen 26 of the mobile R-F welder 20. If this happens, the mobile R-F welder 20 must be continually stopped to remove the stuck parts, which may severely limit productivity. It is impractical to use mechanical clamp systems to hold the work pieces 12 from sticking to the upper platen 26. However it is common in R-F welding that dielectric 'buffers' are used between the weld electrode or upper platen and the fabric part. The buffer is used to isolate the work piece 12 from direct contact with the upper platen, and/or the weld electrode. The buffer may be any of a number of different insulating materials in the form of a thin sheet, for example Phenolic, Mylar, Teflon, fish paper, glass cloth, or silicone laminates. Each material has its own characteristics, which can differ significantly between materials. Typically the role of the buffer is to provide a barrier to the R-F power being released in an arc and thereby burning the fabric, insulate heat transfer from fabric to electrode or upper platen, or provide fabric release characteristics from the electrode and/or platen.

Therefore the R-F welding system 10 further comprises a buffering system 60 that includes a near non-stick buffer 62 adapted to engage the flexible work piece 12 and the mobile radio frequency welder 20, and a slightly sticky buffer 64 adapted to engage the flexible work piece 12 and the movable welding electrodes 22. The buffering system 60 allows for an automated, progressive R-F welding system 10 as it ensures that flexible work pieces 12 do not stick to the upper platen 26 after welding. The passive buffering system 60 holds the work pieces 12 and allows them to break free from the upper platen 26 automatically and reliably.

The near non-stick buffer 62 is positioned between the upper platen 26 and the flexible work piece 12, whereas the slightly sticky buffer 64 is positioned between the flexible work piece 12 and the movable welding electrodes 22. The near non-stick buffer 62 is mechanically attached to the upper platen 26, while the slightly sticky buffer 64 is mechanically attached to the welding electrode 22. Each welding electrode 22 on the entire weld platform 18 is equipped with the slightly sticky buffer 64. The buffering system 60 therefore ensures that the flexible work piece 12 will always be pulled away from the upper platen 26 after welding, but will still be easy for operators to remove the flexible work pieces 12 from the movable weld electrodes 22. The flexible work piece 12 sits on the slightly sticky buffer 64, which provides a slight retention after welding, therefore ensuring the flexible work piece 12 does not move or get carried away with movable R-F welder 20. The near non-stick buffer 64 is positioned over upper platen 26 of the movable R-F welder 20. During the welding process, the near non-stick buffer 64 head buffer contacts the flexible work piece 12 which is placed over the movable welding electrodes 22.

Other variations and modifications of the invention are possible. All such modifications or variations are believed to be within the sphere and scope of the invention as defined by the claims appended hereto.

I claim:

1. A radio frequency welding system for progressively producing varied welds on a series of subassemblies of thermoplastic layers having a topside and a underside to produce a single complex welded product, comprising;
   (a) a fixed weld platform;
   (b) a mobile radio frequency welder having an upper platen smaller than the fixed weld platform and a grounding apparatus mounted to the mobile radio frequency welder, wherein the mobile radio frequency welder and upper platen are adapted to move across the surface area of the fixed weld platform;
   (c) movable welding electrodes of varying number, size and shape configured across the surface area of the fixed weld platform and adapted to engage the underside of the thermoplastic layers; and
   (d) movable grounding apparatus adapted to engage the fixed weld platform and the grounding apparatus of the mobile radio frequency welder so as to provide a radio frequency electrical return circuit;
   (e) a template system adapted to engage the fixed weld platform and having a positioning system to identify, position and retain the movable welding electrodes which retain the thermoplastic layers, the template system is changeable without tools and has cut-outs that correspond to the movable welding electrodes and the movable grounding apparatus so that the movable welding electrodes and the movable grounding apparatus sit within the cut-outs;
   wherein a series of subassemblies of the thermoplastic layers are positioned over the fixed weld platform and movable welding electrodes and the mobile radio frequency welder moves over the topside of the thermoplastic layers and fixed weld platform, and engages the movable welding electrodes through the thermoplastic layers in automatic progressive process to produce a series of varied welds to create the single complex welded product.

2. A radio frequency welding system for thermoplastic thermoplastic layers as claimed in claim 1 wherein additional cut-outs correspond to the positioning of additional components.

3. A radio frequency welding system for thermoplastic layers as claimed in claim 1 wherein the positioning system to identify, position and retain the thermoplastic layers is a series of symbols regularly indexed along and across the fixed weld platform.

4. A radio frequency welding system for thermoplastic layers as claimed in claim 3 wherein the movable grounding apparatus is at least one ground block adapted to engage the fixed weld platform and the ground apparatus mounted to the mobile radio frequency welder.

5. A radio frequency welding system for thermoplastic layers as claimed in claim 4 wherein the movable grounding apparatus is at least one biased, retractable ground block adapted to engage the fixed weld platform.

6. A radio frequency welding system for thermoplastic layers as claimed in claim 5 wherein the biased, retractable ground block is a collapsing column having a first stage collapsed height and a second stage collapsed height.

7. A radio frequency welding system for thermoplastic layers as claimed in claim 6 wherein the biased, retractable ground block is biased in resting position by a spring and is moved to an actuating position by a vacuum system.

8. A radio frequency welding system for thermoplastic layers as claimed in claim 7 wherein the vacuum system follows the movement of the mobile radio frequency welder and the vacuum system is routed under the fixed weld platform.

9. A radio frequency welding system for thermoplastic layers as claimed in claim 8 wherein the fixed weld platform further comprises a series of holes so that when the vacuum system is actuated a vacuum is created through the series of holes and the vacuum system positions the layers on the fixed weld platform.

10. A radio frequency welding system for thermoplastic layers as claimed in claim 7 further comprising a chilling system adapted to control the temperature variation of the mobile radio frequency welder.

11. A radio frequency welding system for thermoplastic layers as claimed in claim 10 wherein the chilling system further comprises refrigeration units mounted to the mobile radio frequency welder and passages running through the upper platen.

12. A radio frequency welding system for thermoplastic layers as claimed in claim 7 further comprising a buffering system.

13. A radio frequency welding system for thermoplastic layers as claimed in claim 12 wherein the buffering system further comprises a near non-stick buffer adapted to engage the flexible work piece and the mobile radio frequency welder and a slightly sticky buffer adapted to engage the layers and the movable welding electrodes.

14. A radio frequency welding system for thermoplastic layers as claimed in claim 13 wherein the near non-stick buffer is attached to the upper platen.

15. A radio frequency welding system for thermoplastic layers as claimed in claim 13 wherein the slightly sticky buffer is attached to the welding electrode.

16. A method for automatically and progressively producing varied welds on thermoplastic layers having a topside and a underside using a radio frequency welding system to produce a single complex welded product, comprising:
   (a) placing the underside of a series of subassemblies of the thermoplastic layers on movable welding electrodes of different size and shape configured over a fixed weld platform using a template system adapted to engage the fixed weld platform and having a positioning system to identify, position and retain the movable welding electrodes which retain the thermoplastic layers, the template system is changeable without tools and has cut-outs that correspond to the movable welding electrodes and the movable grounding apparatus so that the movable welding electrodes and the movable grounding apparatus sit within the cut-outs;
   (b) activating a mobile radio frequency welder platform and a series of ground bars mounted to the mobile radio frequency welder, adapted to move over the fixed weld;
   (c) engaging movable grounding apparatus adapted to engage the fixed weld platform and the mobile radio frequency welder so as to provide a radio frequency electrical return circuit;
   (d) moving the mobile radio frequency welder over the topside of the thermoplastic layers and fixed platform, and engaging the movable welding electrodes through thermoplastic layers in a single progressive process automatically to produce a series of varied welds.

* * * * *